United States Patent

Koll

[15] 3,652,992

[45] Mar. 28, 1972

[54] METHOD AND APPARATUS FOR QUANTIZING A CHARACTER OR TEST PATTERN PREFERABLY FOR THE PURPOSE OF GAINING CONTROL DATA FOR ELECTRONIC PHOTO COMPOSITION

[72] Inventor: Roman Koll, Kiel-Wellingdorf, Germany

[73] Assignee: Dr.-Ing. Rudolf Hell

[22] Filed: Oct. 20, 1969

[21] Appl. No.: 867,580

[30] Foreign Application Priority Data

Nov. 2, 1968 Germany ......................P 18 06 559.3

[52] U.S. Cl. ..................................340/146.3 B, 250/219 CR
[51] Int. Cl. ..........................................................G06k 9/00
[58] Field of Search ..................340/146.3; 250/235, 219 CR

[56] References Cited

UNITED STATES PATENTS

| | | | |
|---|---|---|---|
| 3,205,367 | 9/1965 | Whitesell | 250/235 |
| 3,226,697 | 12/1965 | Fujitsubo | 340/146.3 X |
| 3,426,324 | 2/1969 | Manly | 340/146.3 |
| 3,444,517 | 5/1969 | Rabinow | 340/146.3 |
| 3,484,747 | 12/1969 | Nunley | 340/146.3 |
| 3,496,541 | 2/1970 | Haxby et al. | 340/146.3 |

*Primary Examiner*—Maynard R. Wilbur
*Assistant Examiner*—Leo H. Boudreau
*Attorney*—Hill, Sherman, Meroni, Gross & Simpson

[57] ABSTRACT

The edges of a test pattern which lie along the direction of scanning are provided with companion tapes of a contrasting color which causes the generation of a signal during scanning to prevent undesired operation of recording equipment in response to undesired alterations of dark and light data due to distortion of the character or misalignment of the character with respect to the scanning direction. The sensing apparatus employs means for point-by-point and area-by-area outer-field sensing of data from the character and means for permitting storage of the data so sensed in accordance with an outer-field scan of areas immediately adjacent the scanned points. The sensing apparatus includes an apertured diaphragm for direction the information of the point-by-point or sharp scanning to a registration control circuit and the information derived from outer-field scanning to the registration control circuit for preventing the registration of information detected due to flaws or inadvertent irregularity of character contours.

11 Claims, 5 Drawing Figures

INVENTOR.
Roman Koll
BY Hill, Sherman, Meroni, Gross & Simpson
ATTORNEYS

INVENTOR.
Roman Koll

BY Hill, Sherman, Meroni, Gross & Simpson
ATTORNEYS

METHOD AND APPARATUS FOR QUANTIZING A CHARACTER OR TEST PATTERN PREFERABLY FOR THE PURPOSE OF GAINING CONTROL DATA FOR ELECTRONIC PHOTO COMPOSITION

BACKGROUND OF THE INVENTION

1. Field of the Invention

This invention relates to a method of quantizing a character which may be in the form of a letter, figure, punctuation mark or the like, or of a test pattern, preferably for the purpose of gaining control data for electronic photo composition.

2. Description of the Prior Art

The prior art generally recognizes photoelectric scanning of a character to provide binarily coded data representing light and dark fragments of a scanned character and its background. The method employs the provision of a graphic pattern, generally provided with a raster line net, on which the character or sample is illustrated greatly enlarged with respect to the size to be composed, and includes photoelectric scanning point by point and line by line or column by column of the sample to traverse lengths of successive alternating light and dark fragments of each line or column which are determined as members of minimum units which, for example, are predetermined by the mesh width of the raster net employed. The light and dark fragments are read as binarily coded data into a buffer memory in the form of a perforated tape, magnetic tape or the like, and are read therefrom into a magnetic core memory. As is well known, the picture contents thus stored are read from the core memory during the composing process.

The present invention relates particularly to the scanning of the contour fragments of the character or test pattern extending in the scanning direction. Provided that this scanning, as preferred, is effected, by column, these contours will hereinafter, for the sake of brevity, also be designated as vertical contours.

It has been shown that in scanning a straight vertical contour a single value equally the total length of this vertical contour is not always determined, as expected, but a number of sub-values are determined which are registered in more or less frequent and irregular alternation as light and dark data. The primary reason for this uncertain scanning resides in the fact that the pattern carrier is misaligned as a result of changes in temperature and humidity so that the originally selected perfectly straight contour receives slight indentations. As a result, in the most unfavorable case, a certain residual error is additionally found in the straight-line motion of the scanning head which cannot be avoided.

Misalignment of the character with respect to the direction of scanning, such as discussed above, causes the composed character to take on a jagged appearance since each light or dark decision of the scanning device has validity for the full width of a column (or height of a line) whereby the relatively small lack of rectilinearity of contour during the composing process is coarsely reproduced. Thus, the jagged appearance.

A particularly disadvantageous consequence of the uncertain scanning resides above all in the fact that an unnecessarily great number of core memory cells must be employed. These drawbacks are more important, if, for example, characters are involved which are to be composed a few times larger than the characters of the remaining text, such as for newspaper headlines. Since these bold face characters undergo fewer heavy reductions with respect to the pattern than do the remaining characters, their contour errors will become much more noticeable. Also, the requirement for the utilization of additional core memory cells is particularly inconvenient, and uneconomical, for in order to be able to still record characters in these several-times-larger type sizes as a coherent blackening, the character pattern which, for reasons of economy, always has the same size, must be scanned in a resolution which is several times finer. In other words, the minimum unit underlying the counting must be selected several times smaller. For patterns having a raster line net, this means that the mesh of the raster net originally counted as a minimum unit must instead be counted as two or more minumum units. Accordingly, each mesh of the raster net must be likewise scanned in a plurality of columns or lines. Thus, as a result of this final resolution, it is necessary to employ several times the number of core memory cells. Unless it is absolutely necessary, one should therefor employ as few memory cells as possible.

SUMMARY OF THE INVENTION

According to the invention, the uncertainties in the contour scanning described are removed in that contour fragments of the character or test pattern extending in the scanning direction are in each case provided with a companion tape which is distinguishable therefrom, and that during the scanning of the pattern a particular signal is derived from the presence of the companion tape and utilized to prevent the response of the recording equipment to an alternation of dark and light data (or vice versa) occurring during the scanning of such a contour fragment. Thus, the recording equipment sees and remains adjusted to that information until the scan reaches the end of the comparison tape that which was present at the beginning of the scan of the comparison tape. In other words, the entire number of minimum units counted during a scan relate to that particular information and that information only, even if occassionally the other of the two possible data occurs erroneously.

The width of the companion tape is not critical; it must merely be chosen such that the inaccuracies of the contour are bridged with certainty. Also, if the character or test pattern model is illustrated in, for example, black and white, the companion tape is appropriately designed in bright colors.

According to the invention, the method thereof is advantageously carried into effect in that simultaneously with the point-by-point scanning (sharp scanning) there also occurs an outer-field scanning whose greatest portion includes the side field adjacent a point, and that the electric values coming from the sharp scanning and from the outer-field scanning are each fed to one of the two inputs of a gate circuit which is interposed between the photoelectric detectors and the recording equipment. The gate circuit is formed in such a manner that it is blocked when the outer-field scanning senses the companion tape, and therefore prevents registration of data which is not compatible with the existence of the sensed companion tape.

BRIEF DESCRIPTION OF THE DRAWINGS

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure, and in which.

Figure 4:
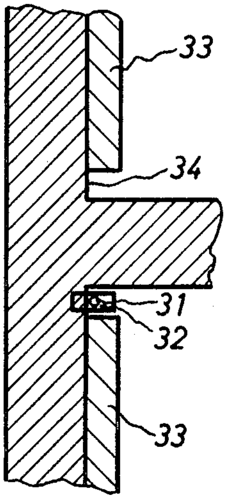
Figure 3:
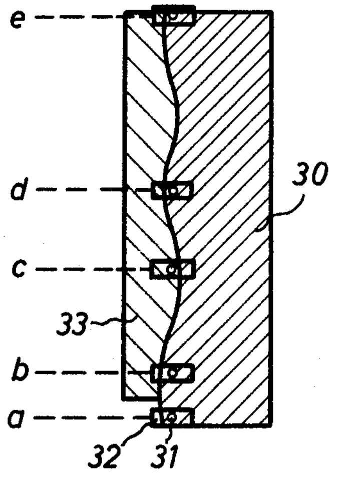
Figures 2, 2A:
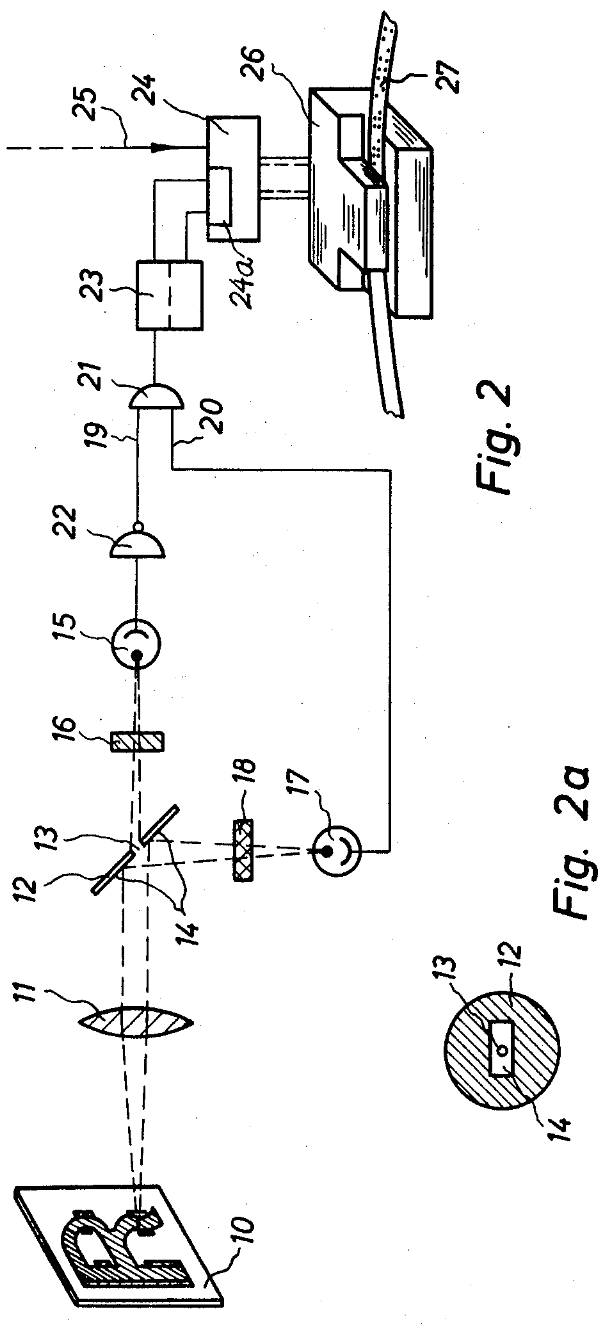
FIG. 2 is a schematic representation of a photoelectric scanning system for carrying out the method of the present invention.

FIG. *2a* is a plan view of an apertured diaphragm employed in the apparatus of FIG. 2;

FIG. 3 shows a vertical contour fragment, wherein the contour is exagerated to illustrate a lack of rectilinearity; and FIG. 4 shows a character fragment having intersecting vertical and horizontal contours and illustrates the termination of the companion tapes at such intersections.

DESCRIPTION OF THE PREFERRED EMBODIMENT

Figure 1:
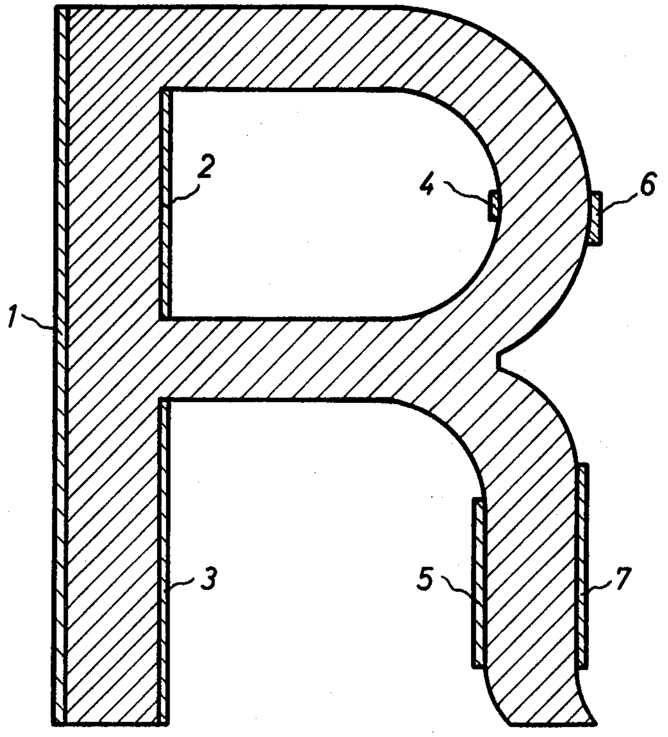
FIG. 1 illustrates an example of the letter "R" which has been provided with companion tapes according to the principles of the invention.

In the drawings, the letter "R" which is to be considered as a character pattern for illustrative purpose is shown in FIG. 1. All of the straight vertical contours of the character, as well as short fragments of the curved contours, so far as they can be approximately replaced by a vertical tangent, are provided with the companion tapes 1–7.

The companion tapes are made distinguishable from the character by a difference in the shadings in the drawing. As a means of a non-limiting example, in the present black and white drawing the shading of the character is of one style to represent black, whereas the shading of the companion tape is of a different style in order to represent a bright color.

The characters and companion tapes are constructed such that they can be scanned in the same manner, namely optically; this being technically the simpliest solution. However, it is likewise possible to construct the companion tape in a different manner, namely mechanically, magnetically, or electrically.

In the apparatus schematically illustrated in FIG. 2, the reference numeral 10 represents the pattern carrier to be scanned, which carrier has the letter "R" shown thereon as illustrated in FIG. 1. By means of a lens 11, a real picture of the momentarily scanned portion of the pattern is projected on a diaphragm 12. As shown in detail in FIG. 2*a*, the diaphragm 12 has a relatively small diaphragm aperture 13 adapted for sharp scanning, which is surrounded by a rectangular reflector surface 14 adapted for outer-field scanning. The remaining surface of the diaphragm 12 is preferred to be black and mat-finished.

The light beam penetrating through the diaphragm aperture 13 falls on a photocell 15. A color filter 16 is disposed between the diaphragm 12 and the photocell 15 and has a coloring which corresponds to the coloring of the companion tape so that the companion tape and the white of the carrier 10 produce at least approximately equal light effects at the photocell 15.

The light of the scanned outer field is deflected to a photocell 17 by means of the reflector surface 14 of the diaphragm 12. A color filter 18 is disposed in this path of rays which represents a complementary color filter with respect to the color filter 16. Thus, the companion tape operates for sharp scanning (photocell 15) as a light surface, and for the outer field scanning (photocell 17) as a dark surface.

The output voltages of the photocells 15 and 17 are in each case fed to one of the two inputs 19 and 20 of an AND gate circuit 21, whereby the output voltage of the photocell 15 is first inverted by means of a NOT circuit 22. The AND gate circuit 21 and the NOT circuit 22 cooperate in a manner such that a flip-flop circuit 23 connected to the output of the AND gate circuit 21 responds to the signal transmitted by the photocell 15, when at the input 20 of the AND gate circuit 21 there is a voltage delivered by the photocell 17, that is, when the outer field is light. In such a case, the flip-flop circuit 23 is flipped each time the signal is changed (from light to dark or vice versa), and causes a coder 24 to assign all of the minimum units counted by counter 24*a*, from this change to the next, to the same information (light or dark) in such a way that a given code point is stored or not stored.

A control command is given by way of the line 25 to transfer the respective counter result to a tape puncher 26 and to cause the tape puncher to punch a hole combination in a tape 27.

The mode of operation of this device may be seen from a consideration of the varying contour of contour fragment 30 which is drawn in an exaggerated fashion in FIG. 3. In this illustration reference numeral 31 represents the scanning point seized by the diaphragm aperture 13 and reference numeral 31 represents the outer field. In position *a*, the scanning point 31 has traversed upwardly against the black contour, but the outer field 32 still contains such a great portion of the white of the pattern carrier that there is sufficient photocell voltage at the output 20 of the AND gate 21 to keep the latter open; the flip-flop gate 23 may therefore flip in the position assigned to the information "dark." It should be noted that the circuit must be imagined as adjusted in a manner such that the outer field is evaluated as light, as long as its white portion remains below 10 percent.

In the position *b*, the outer field scanning siezes the companion tape 33 which, as explained above, it evaluates as a dark surface so that the photocell 17 no longer delivers a voltage and the AND gate 21 is blocked. Thus, until the scan traverses to the end of the companion tape 33, all counted minimum units are assigned to the information "dark" even if the sharp scanning ceases light surface portions in the meantime, which, for example, is the case in the position *c*. As explained hereinbefore, the effect is the same whether these surface portions are actually white or exhibit the coloring of the companion tape.

Thus, any flipping of the flip-flop circuit 23 is prevented during this undesired alternation of information as well as during the subsequent return to the dark contour, such as it occurs on the further path from position *c* to position *d*. The counter 24 therefore continues to count minimum units as representing "dark."

At the distal end of the companion tape, with respect to the scan direction, i.e. in the position *e*, the white of the original copy support or carrier is first seized by the outer field portion of the scan, as a result of which the AND gate 23 is unblocked again and opened. The apparatus is therefore rendered ready to register the subsequent alternation of information determined by the sharp scanning, namely from "dark" of the character to "light" of the pattern carrier.

FIG. 4 illustrates the situation where a horizontal beam of a character meets a vertical beam of the character. In such a case, a certain gap 34 must be left free between the beginning or the end of the companion tape 33 and the edge of the horizontal beam which is at least approximately as large as the height of the outer field 32. These gaps are necessary so that during the time that the scanning point 31 traverses upwardly against the horizontal beam, the outer field 32 is light with all certainty.

The apparatus described above and illustrated in FIG. 2 has proved to be advantageous not only in scanning contours but also in scanning the entire surface of a character or test pattern. The original copies to be scanned are preferably photographed or are photographic copies. However, photographically blackened surfaces frequently contains all transparent flaws which during the sharp scanning, are sufficient to cause an undesired alternation of information. However, in comparison to the size of the outer field such flaws are so insignificant that the outer field, even if it contains such flaws, is evaluated as dark and the AND gate 12 remains blocked.

I claim:

1. A method of quantizing a character to provide control data for electronic photo composition thereof, comprising the steps of disposing the character on a carrier having a background for the character included within a field to be scanned, placing companion areas along edge portions of the character which extend along a predetermined direction, the background and the character and the companion areas being provided as elements of first, second and third different colors, photoscanning the field in the direction of the predetermined direction on a point-by-point basis and contemporaneously photoscanning the field in the direction of the predetermined direction on an area-by-area basis with the scanned areas being adjacent the scanned points, determining for each point scanned whether the point is of the type which falls on the character or the type which falls on the background, those points falling on the companion areas being predetermined as falling on the background by filtering one portion of the light rays to provide data light rays including the first and second colors and excluding the third color, determining for each adjacent area scanned whether an area falls primarily on the character or primarily on the background, a companion area within an adjacent area being predetermined as being included within the character by filtering another portion of the light rays to provide control light rays including the second and third colors and excluding the first color, counting the number of successive occurrences of first or second colors in the data light rays of the filtered one portion of the light rays, encoding each number so counted upon detection of a control ray which is different than the previously detected control ray, and registering the encoded numbers.

2. The method according to claim 1, wherein before the filtering steps the method further comprises the step of dividing the light rays into two groups, one group emanating from a scanned point and the other group emanating from the corresponding adjacent area.

3. Apparatus for quantizing a symbol to provide data representing the structure of the symbol for electronic photo composition of the symbol, comprising a carrier mounting the symbol and providing a background therefor, the symbol being of a first color and the background being of a second color;

photoscanning means for scanning a field which includes the symbol and its background on a point-by-point basis to receive light rays of said first and second colors from the scanned points and corresponding discrete areas immediately adjacent thereto;

first detection means for producing first and second electrical data signals representing said first and second color light rays received from the scanned points;

second detection means for producing first and second electrical data signals representing the predominant first and second color light rays received from said discrete areas;

said photoscanning means comprising means for receiving the light rays from the scanned field including first means for directing the light rays received from the scanned points to said first detection means and second means for directing the light rays from the discrete areas to said second detection means;

said means for receiving light rays from the scanned field including a disc, said first directing means including means defining an aperture in said disc and said second directing means including reflected means carried on said disc and disposed at an angle relative the direction of received light rays;

data registration means; and means operated in response to said second detection means upon parity of said first signals, and upon parity of said second signals, to effect storage of data representing the first and second data signals in said data registration means.

4. Apparatus for quantizing a symbol to provide data representing the structure of the symbol according to claim 3, wherein said companion areas are dimensioned and disposed on the carrier to provide a gap between each such companion area and portions of the symbol which extend in the direction other than the scanning direction, such a gap being dimensioned in the direction of scan at least the dimension of the discrete areas in the direction of scanning.

5. Apparatus for quantizing a symbol to provide data representing the structure of the symbol according to claim 3, wherein said companion areas are formed as colored tapes affixed to said carrier.

6. Apparatus for quantizing a symbol to provide data representing the structure of the symbol according to claim 3, wherein said first and second detection means include respective first and second photocell devices for generating the corresponding electrical data signals.

7. Apparatus for quantizing a symbol to provide data representing the structure of the symbol for electronic photo composition of the symbol, comprising a carrier mounting the symbol and providing a background therefor, the symbol being of a first color and the background being of a second color;

photoscanning means for scanning the field which includes the symbol and its background on a point-by-point basis to receive light rays of said first and second colors from the scanned points and corresponding discrete areas immediately adjacent thereto;

first detection means for producing first and second electrical data signals representing said first and second color light rays received from the scanned points;

data registration means;

second detection means for producing first and second electrical data signals representing the predominant first and second color light rays received from said discrete areas; and means operated in response to said second detection means upon parity of said first signals and upon parity of said second signals to effect storage of data representing the first and second data signals in said data registration means, said means for effecting storage including resettable counting means for generating data structure signals, means connected to said first and second detection means for comparing the output data signals thereof, and bistable means connected between said comparing means and said counting means for controlling the operation of said counting means, said bistable means being operated to start said counting means upon occurrences of non-parity.

8. Apparatus for quantizing a symbol to provide data representing the structure of the symbol according to claim 7, wherein said comparing means includes an AND gate having a first input connected to said first detection means and a second input connected to said second detection means, and wherein said first detection means includes a NOT gate for inverting the output thereof for said AND gate.

9. Apparatus for guantizing a symbol to provide data representing the structure of the symbol for electronic photocomposition of the symbol, comprising a carrier mounting the symbol and providing a background therefor, the symbol being of a first color and the background being of a second color;

companion areas of a third color carried on said carrier immediately adjacent portions of the symbol which extend in the direction to be scanned;

photoscanning means for scanning a field which includes the symbol, its background and said companion areas on a point-by-point basis to receive light rays of said first, second and third colors from the scanned points and corresponding discrete areas immediately adjacent thereto;

first detection means for producing first and second electrical data signals representing said first and second color light rays received from the scanned points;

second detection means for producing first and second electrical data signals representing the predominant first and second color light rays received from said discrete areas;

said first detection means comprising first translation means including filter means of the same coloring as said third color of the companion areas for detecting light rays of said third color as effectively light rays of said second color, and said second detection means comprises second translation means including filter means of a coloring complementary to said third color of said companion areas for detecting light rays of said third color as effectively light rays of said first color, whereby the light rays of said third color are employed to aid in defining the edges of the symbol which extend in the direction of scanning;

data registration means; and means operated in response to said second detection means upon parity of said first signals and upon parity of said second signals to effect storage of data representing the first and second data signals in said data registration means.

10. Apparatus for quantizing a symbol to provide data representing the structure of the symbol according to claim 9, wherein said first and second detection means include respective first and second photocell devices for generating the corresponding electrical data signals.

11. In a system for translating the structure of a symbol with respect to its background into binary data for storage in a memory, which system has a scanner for scanning a field including the symbol and its background on a point-by-point basis, a resettable counter having a counting rate related to the rate of scanning, and an encoder for encoding the output of the counter, the improvement comprising strip means disposed at the edges of the symbol which extend in the direction of scanning, said strip means being in color contrast to both the symbol and its background, area-by-area scanning means included within said scanner for scanning discrete areas of the field, each of said discrete areas encompassing a simultaneously scanned point, first detecting means for detecting whether the scanned points fall on the symbol or on the background including first interpreting means for interpreting points which fall on said strip means as falling on the background, second detecting means for detecting whether said discrete areas fall predominately on the symbol or on the background including second interpreting means for interpreting area portions which fall on said strip means as falling on the symbol, and means connecting said first and second detection means to the counter and operated to enable the operation of the counter upon detection of the content of a scanned point and to reset the counter upon detection of an area of predominately opposite content to that of the previous area which effected resetting of the counter.

* * * * *